United States Patent [19]

Brackenbush et al.

[11] Patent Number: 5,340,990
[45] Date of Patent: Aug. 23, 1994

[54] FRACTIONAL CHANNEL MULTICHANNEL ANALYZER

[75] Inventors: Larry W. Brackenbush, Richland; Gordon A. Anderson, Benton City, both of Wash.

[73] Assignee: Battelle Memorial Institute, Richland, Wash.

[21] Appl. No.: 91,574

[22] Filed: Jul. 12, 1993

[51] Int. Cl.$^5$ .............................................. G01T 1/17
[52] U.S. Cl. ................... 250/395; 250/336.1; 250/370.06; 250/369
[58] Field of Search ............... 250/395, 370.06, 369, 250/336.1

[56] References Cited

U.S. PATENT DOCUMENTS

| | | | |
|---|---|---|---|
| 2,653,248 | 9/1953 | Perlow et al. | 250/389 |
| 4,056,725 | 11/1977 | Kamburov et al. | 250/336.1 |
| 4,345,153 | 8/1982 | Yin | 250/369 |
| 4,914,300 | 4/1990 | Kalish | 250/369 |

Primary Examiner—Constantine Hannaher
Attorney, Agent, or Firm—Johnnie R. Hynson

[57] ABSTRACT

A multichannel analyzer incorporating the features of the present invention obtains the effect of fractional channels thus greatly reducing the number of actual channels necessary to record complex line spectra. This is accomplished by using an analog-to-digital converter in the asynscronous mode, i.e., the gate pulse from the pulse height-to-pulse width converter is not synchronized with the signal from a clock oscillator. This saves power and reduces the number of components required on the board to achieve the effect of radically expanding the number of channels without changing the circuit board.

2 Claims, 3 Drawing Sheets

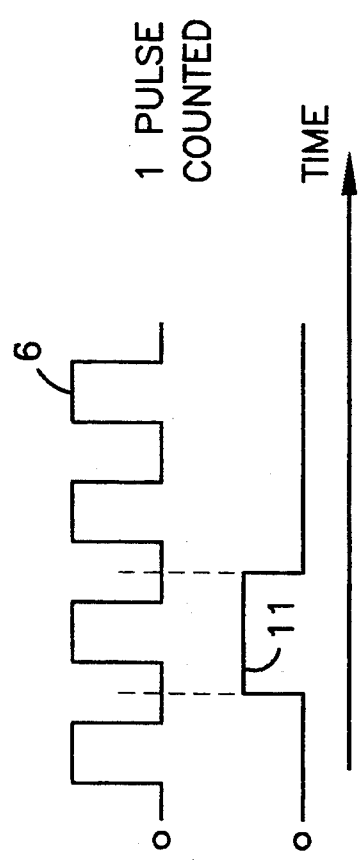
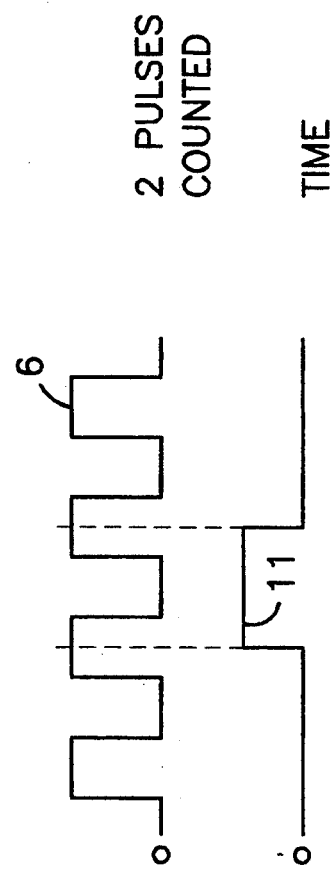
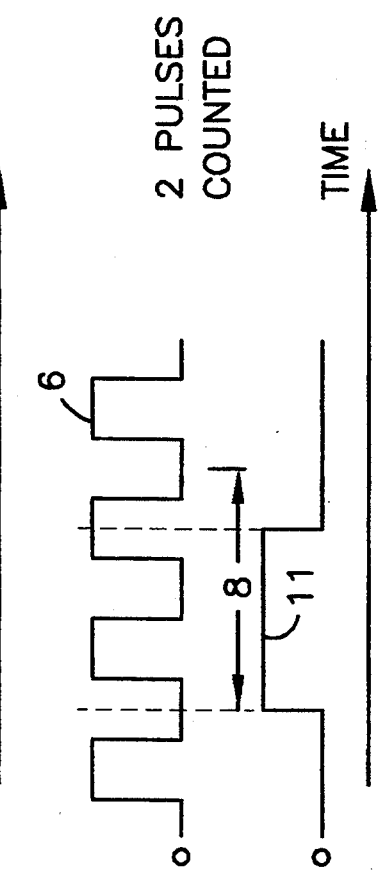
FIG. 2A
FIG. 2B
FIG. 2C

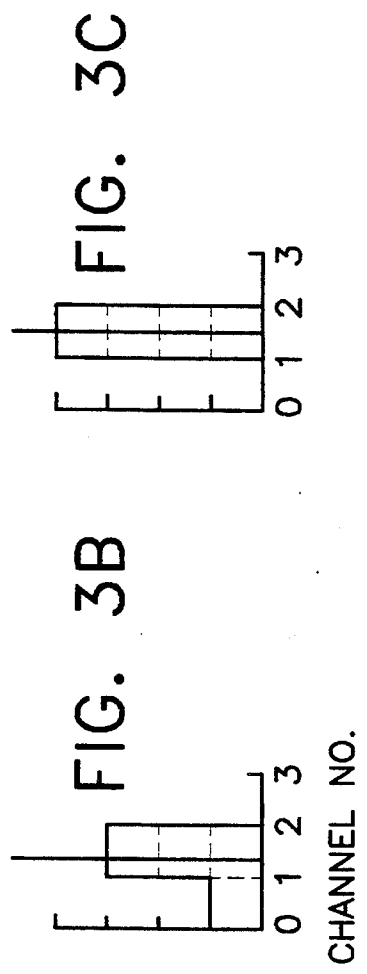
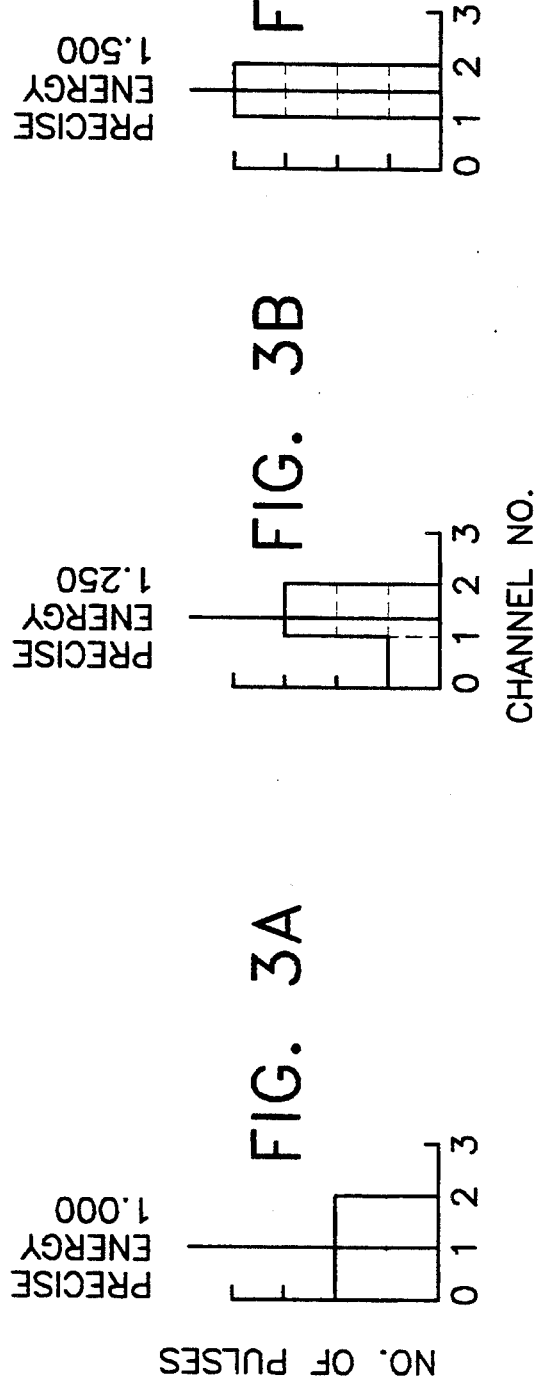
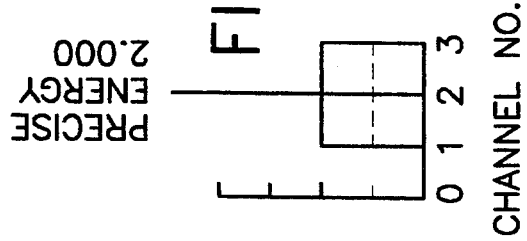
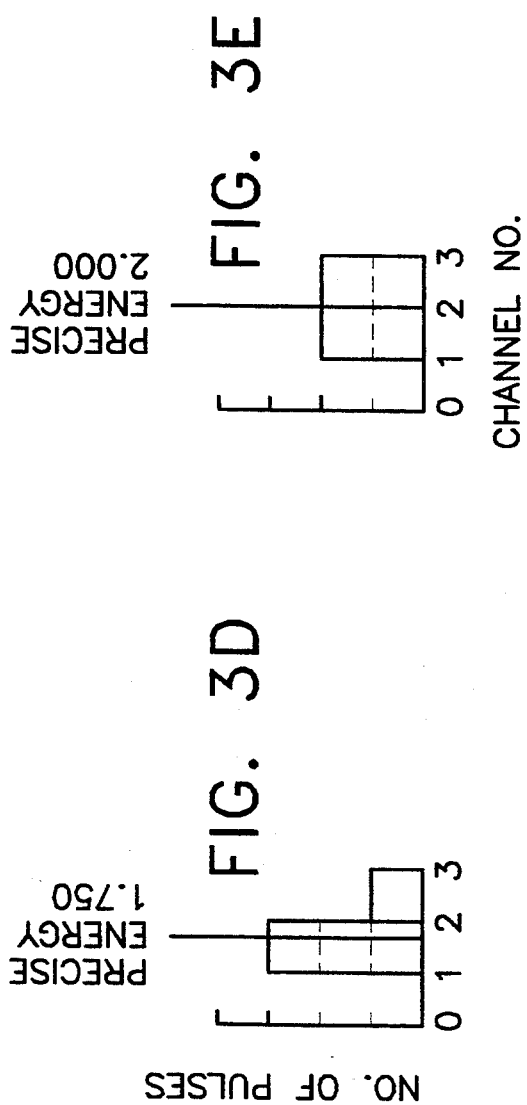
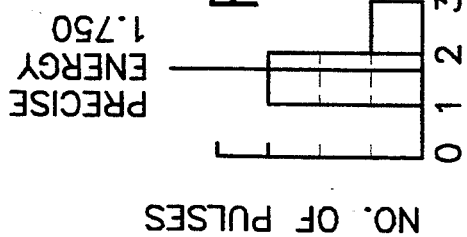

FRACTIONAL CHANNEL MULTICHANNEL ANALYZER

This invention was made with Government support under Contract DE-AC06 76RLO 1830 awarded by the U.S. Department of Energy. The Government has certain rights in the invention.

FIELD OF THE INVENTION

This invention relates to multichannel analyzers specifically adapted to analyze signals having a broad pulse height spectrum.

BACKGROUND OF THE INVENTION

Conventional multichannel analyzers (MCA) operate with the analog-to-digital conversion process linked to a clock or gate pulse. The actual conversion of an analog signal to a digital readout occurs only when synchronized to a gate pulse, thereby resulting in a "stair-step" response. If the analog signal is smaller than a given size, it is inserted into a lower channel; if the analog signal is larger than a given size, it is inserted into a higher bin. When observing energy spectra, the user must spread the signal out over many channels to find the centroid or average energy. In one particular environment, this has resulted in the adoption of 8196 channel multichannel analyzers to record the gamma energy spectrum from germanium detectors. The individual gamma ray lines are typically spread out over several channels to allow the user to determine the centroid or exact energy of the gamma ray. This necessitates very large data files and "power-hungry" electronics to be able to perform the analog-to-digital conversion in a short time.

"Total dose meters" determine the absorbed dose or dose equivalent in mixed radiation fields. It was believed that multichannel analyzers would be useful in such devices. However, total dose meters operate in an environment wherein the pulse height spectrum covers four orders of magnitude, or more. Conventional analog-to-digital converters (ADCs) require too much power to be useful in this range.

SUMMARY OF THE INVENTION

Applicants determined that such problems could be overcome by operating the ADC as a pulse height-to-pulse width converter. The pulse width can then be used to turn on a scaler counter which sums the number of clock pulses from an oscillator. The ADC can then be operated in an asynchronous mode; i.e., the gate pulse from the pulse height-to-pulse width converter need not be synchronized with the clock oscillator. This saves power and reduces the number of components required on the board.

BRIEF DESCRIPTION OF THE DRAWINGS

FIG. 2A illustrates operation of the instant invention when a gate pulse width is the same as one complete clock cycle, thereby only one pulse is recorded;

FIG. 2B illustrates operation of the instant invention when a gate pulse width is displaced in time from clock cycle, thereby two pulses are recorded;

FIG. 2C illustrates operation of the instant invention when the gate pulse width is greater than one clock cycle, but less than two complete clock cycles, thereby producing two pulses that are recorded;

FIG. 3A illustrates the pulse configuration as stored in channels for an energy ratio of 1.000 to that of the exact boundary energy;

FIG. 3B illustrates the pulse configuration as stored in channels for an energy ratio of 1.250 to that of the exact boundary energy;

FIG. 3C illustrates the pulse configuration as stored in channels for an energy ratio of 1.500 to that of the exact boundary energy;

FIG. 3D illustrates the pulse configuration as stored in channels for an energy ratio of 1.750 to that of the exact boundary energy;

FIG. 3E illustrates the pulse configuration as stored in channels for an energy ratio of 2.000 to that of the exact boundary energy.

DETAILED DESCRIPTION OF THE PREFERRED EMBODIMENTS

Figure 1:
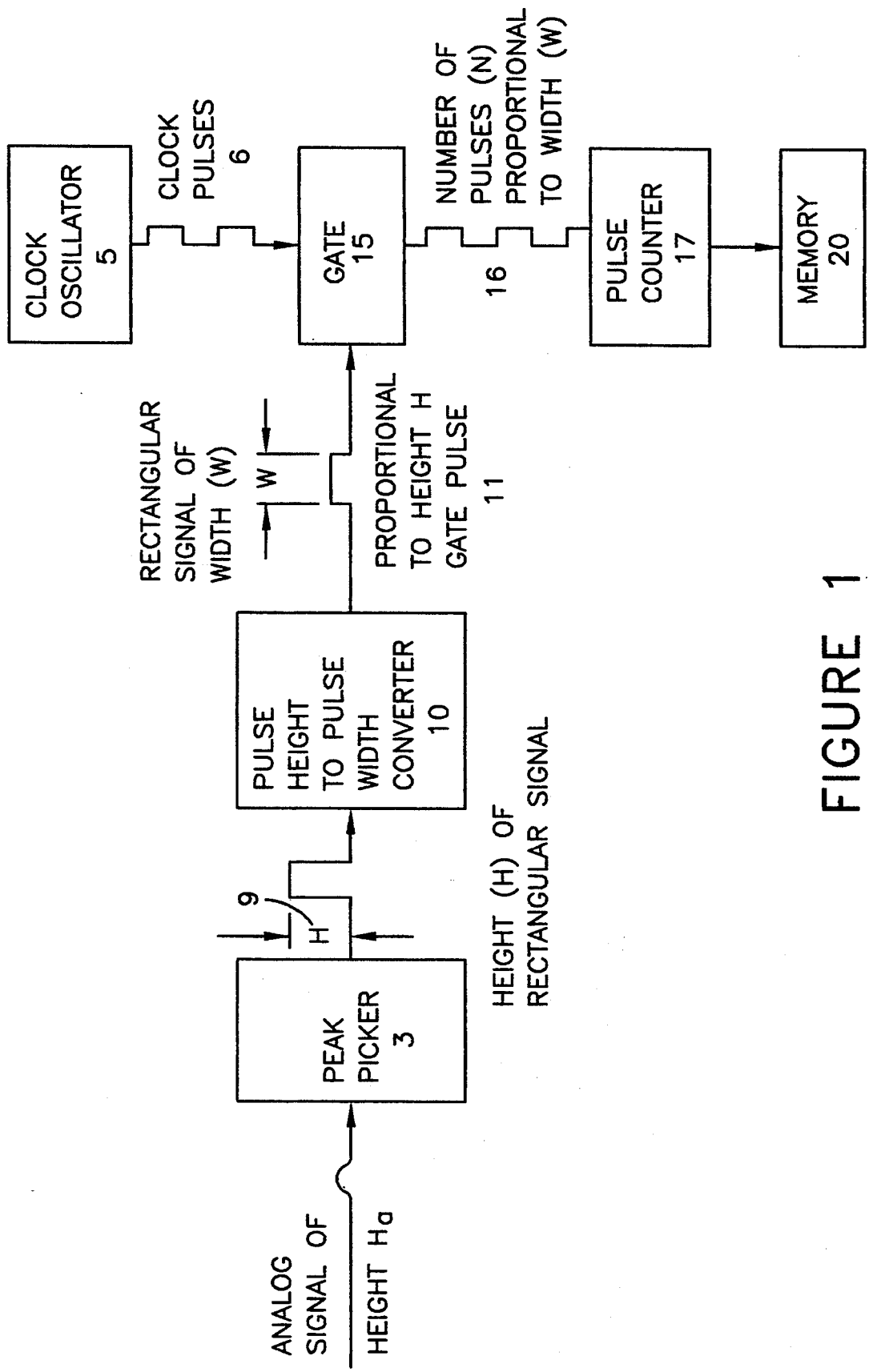
FIG. 1 is a block diagram representation of the analysis process for an incoming signal generated from incident gamma radiation.

Applicants have discovered that a multichannel analyzer (MCA) device incorporating the features of the present invention exhibits a number of unusual properties. By running the ADC as a Pulse height-to-pulse width converter 10 in an asynchronous mode, it is possible to obtain the effect of fractional channels, thus greatly reducing the number of actual channels necessary to record complex line spectra.

CONTROL OF COUNTS PER CHANNEL

In the preferred embodiment of the instant invention the MCA records the spectrum from a peak picker 3, as shown in FIG. 1, or a device with a very precise pulse height, such as a germanium detector in which a channel number which depends on the number of clock pulses 6 counted and compared from a clock oscillator 5.

When the gate pulse 11 from the pulse height-to-pulse width converter 10, is compared by a gate 15 to the clock pulse 6 and is found to overlap the clock pulse 6 the resulting signal 16 is placed in two adjacent channels by the pulse counter 17. The ratio of the counts in each channel is proportional to the probability of overlap between the gate pulse 11 and the clock pulses 6. Thus, the MCA 1 can be viewed as producing fractional channels. The exact pulse height is determined by the ratio of counts in the two channels.

The concept of the instant invention is illustrated by FIGS. 29, 2B, and 2C.

One Pulse is Counted

FIG. 2A illustrates that when the gate pulse 11 width is the same as one complete clock cycle, the gate pulse 11 signal overlaps only one complete clock pulse 6, and only one pulse is recorded.

Two Pulses are Counted

In FIG. 2B, the same width gate pulse 11 is displaced slightly in time, and two clock pulses 6 are recorded. In this case, a number of pulse widths may be equally divided between two adjacent channels in the MCA 1, assuming that the input pulses occur at random and are not synchronized in time with the clock oscillator.

Overlap between Gate and Clock Pulses

In FIG. 2C, the gate pulse 11 width is greater than one clock cycle, but less than two complete clock cycles 8. In this case, the MCA I records two clock pulses 6. Therefore, the number of clock pulses 6 recorded depends on the degree of overlap between the gate and clock pulses 6. If the input pulse is slightly larger, the width of the gate pulse 11 is slightly increased, and a correspondingly larger fraction of the pulses will be recorded in the higher channel. The result is that the ratio of the pulses in the two adjacent channels is proportional to the gate pulse 11 width and to input pulse height 9.

Fractional MCA Channels Are Obtained

This simple technique has interesting consequences. One can obtain, in effect, fractional MCA channels. For example, signals in the form of a given gamma ray line from a germanium gamma ray spectrometer will be recorded in two adjacent channels.

DETERMINATION OF GAMMA RAY ENERGY

The exact gamma ray energy can be linearly interpolated from the ratio of the counts in the channels as illustrated in FIGS. 3A through 3E. These figures illustrate the pulse configuration when a multiple of four input pulses 9 are being inputed into the MCA 1. On these figures the vertical axis is the number of pulses, and the horizontal axis is the channel numbers from 0 through 3, with 0 being the first channel. The channels are not limited under the instant invention to three. These figures are for illustrative purposes.

In FIG. 3A, the gamma ray line is precisely located on the boundary between two channels, and the number of counts in each channel is equal.

In FIG. 3B, the precise gamma line is 1.250 times larger than the energy at the boundary between the two channels. In this case, one fourth of the counts go into channel 1, and three fourths go into channel 2.

In FIG. 3C, the precise gamma energy is exactly 1.500 times the gamma energy at the boundary, and all of the counts go into channel 2.

In FIG. 3D, the precise energy is 1.75 times the energy at the boundary, and one fourth of the counts go into channel 2 and three fourths into channel 3.

In FIG. 3E, the precise energy is 2.00 times the channel width energy, and one half of the counts go into channel 2, and the other half go into channel 3.

EQUIVALENT EFFECT OF A 2048 CHANNEL MCA

With this arrangement, we can obtain the equivalent of a 2048 channel multichannel analyzer using only 256 channels, assuming that the input signal is almost noise free, so that there is no electronic "jitter" introduced into the input signal 9. Spectrometry grade amplifiers have an RMS electronic noise that corresponds to about 300 electrons in the detector, and thus the amplifiers are virtually noise-free. With this arrangement, we can achieve very precise energy resolution in a fraction of the number of channels normally required in a conventional MCA. An MCA 1 utilizing the instant invention will be an order of magnitude smaller, require significantly less power, and cost about an order of magnitude less than conventional MCAs.

The instant multichannel analyzer/data logger is a 252 channel MCA I that can record up to 244 individual spectra in memory 20. Each individual spectrum is recorded with a time stamp to identify it. The entire unit is powered by 9-volt "transistor" batteries. If desired, the unit can be powered by a rechargeable battery pack with a solar cell to recharge the batteries. In this configuration, the unit could be left unattended for months in hostile environments to automatically record any type of pulse height data from a variety of sensors.

As shown in FIG. 1 the instant apparatus includes means for converting an analog signal of height "$H_a$" to a first rectangular signal of height "H" 9 and means for generating clock pulses 6. Further, means are provided for converting height "H" 9 of the first rectangular signal to a second rectangular signal, referred to as a gate pulse 11 having a width "w" proportional to height "H" 9, and a gate 15 which is a means for receiving the second rectangular signal asynchronously with the clock pulse 6. The result is an output pulse 16 from the gate means wherein the clock pulses 6 are proportional to the width "w" of the gate pulse 11.

OTHER EMBODIMENTS

With the advent of small, low-power, inexpensive MCAs, a host of new applications are possible, such as:

Environmental monitoring—Simple radiation detectors/spectrometers can be left unattended in remote locations to record the radionuclide content of the surrounding environment. Health physicists at such sites can use these devices to monitor the resuspension of radionuclides in the environment. Specifically, use of alpha spectrometers to monitor plutonium aerosols has been proposed. If the devices can be made very inexpensively, it may be possible to place gamma ray spectrometers using scintillators in the environment to monitor the movement or release of specific radionuclides. With chemical analyses costing as much as $100 per sample, an in situ monitor would be economical if several samples were taken. In addition, a real-time monitor with a complete record of the movement of radionuclides with time could provide legal records and a basis for more realistic dose commitment calculations.

Monitoring wells or underground storage tanks—The miniature MCA 1 are small and rugged enough to be placed down-hole to monitor contaminants or radionuclides in wells or storage tanks. They can be programmed to read spectra out periodically and to alarm if levels exceed previously set values. They can be attached to a variety of detectors that provide 0 to +5-volt pulses. Detectors have already been made using NaI or BGO scintillators for gamma ray spectra and $^3$He proportional counters for monitoring neutrons.

Personal radiation monitors—The original "total dose meter" was intended to be worn on workers to monitor their exposure to ionizing radiations, including neutrons and gamma rays. The miniature MCA 1 could be easily adapted to record more detailed energy deposition spectra from tissue equivalent proportional counters.

Monitoring hazardous shipments—The miniature MCA 1 can be used to monitor hazardous or radioactive shipments for leakage. This unit could provide a time profile if any unusual event or leakage occurs. Also, the micro-MCA 1 could be attached to accelerometers to provide a history of shocks to the shipment to ascertain if the shipment were damaged in transit.

Voice recorder—If a frequency-to-analog converter were used, the device could be used to digitally record voices. The voice signal could be sampled every 10 to 100 milliseconds, and the spectrum recorded sequentially. To reconstruct the voice signal, it would be necessary to pass the recorded spectra back through an analog signal-to-frequency converter. This may be a different approach to digital telephone answering machines.

Remote chemical sensors—If attached to a variety of chemical sensors, the micro-MCA 1 could be used to remotely monitor for chemicals in the environment. With the current emphasis on monitoring releases of chemicals into the environment, this may be an inexpensive way to continuously monitor for specific chemicals. Such a monitoring system could be placed around landfills, underground storage tanks (by placing the monitors in wells), or effluent streams from industrial facilities.

Obvious modifications and variations of the instant invention are possible in light of the above teachings. Although we have illustrated a preferred embodiment, it is understood that it is merely illustrative and that many modifications may be made thereto without departing from the spirit and scope of the present invention, and that the scope of the invention should be limited only by the scope of the appended claims.

We claim:

1. An apparatus for multichannel analysis of signals having a broad pulse height spectrum, said apparatus having (a) means for converting an analog signal of height "$H_a$" to a first rectangular signal of height "H", and (b) a means for generating clock pulses wherein the improvement comprises:

i. means for converting height "H" of said first rectangular signal to a gate pulse having a width "w" proportional to height "H", and
   ii. a gate means for receiving said gate pulse asynchronously with said clock pulses wherefrom output pulses from said gate means are a number of clock pulses proportional to the width "w" of said gate pulse;
   wherein said pulses are counted and recorded in channels, thereby producing the effect of having a higher number of channels available for determination of incident radiation energy.

2. A method for multichannel analysis of signals having a broad pulsed height spectrum said method having the steps of (a) converting an analog signal of height "$H_a$" to a first rectangular signal of height "H" and (b) generating clock pulses, wherein the improvement comprises the steps of: generating clock pulses, wherein the improvement comprises the steps of:

(a) converting height "H" of said first rectangular signal to a second rectangular signal having a width "w" proportional to height "H", and
   (b) receiving said second rectangular signal asynchronously with said clock pulses and producing output pulses that are a number of clock pulses proportional to the width "w" of said second rectangular signal, wherein said pulses are counted and recorded in channels, thereby producing the effect of having a higher number of channels available for determination of incident radiation energy.

* * * * *

UNITED STATES PATENT AND TRADEMARK OFFICE
CERTIFICATE OF CORRECTION

PATENT NO. : 5,340,990
DATED : August 23, 1994
INVENTOR(S) : Larry W. Brackenbush, et. al.

It is certified that error appears in the above-indentified patent and that said Letters Patent is hereby corrected as shown below:

Column 1, line 17, replace "analog-to--" with --analog- to- --.
In column 2, line 7, please replace "1,250" with --1.250--.
In column 2, line 49, please replace "29" with --2A--.

Signed and Sealed this

Fourth Day of June, 1996

Attest:

BRUCE LEHMAN

*Attesting Officer*     *Commissioner of Patents and Trademarks*